United States Patent
Deshpande (10) Patent No.: US 11,093,990 B2
(45) Date of Patent: *Aug. 17, 2021

(54) SYSTEM AND METHODS FOR PRESENTING INFORMATION ABOUT PRODUCTS BASED ON MOVEMENT OF THE PRODUCTS

(71) Applicant: MASTERCARD INTERNATIONAL INCORPORATED, Purchase, NY (US)

(72) Inventor: Rahul Deshpande, St. Louis, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 183 days.

This patent is subject to a terminal disclaimer.

(21) Appl. No.: 16/221,907

(22) Filed: Dec. 17, 2018

(65) Prior Publication Data

US 2019/0122280 A1    Apr. 25, 2019

Related U.S. Application Data

(63) Continuation of application No. 14/509,363, filed on Oct. 8, 2014, now Pat. No. 10,157,409.

(51) Int. Cl.
*G06Q 30/06* (2012.01)
*H04W 4/02* (2018.01)
*H04W 4/80* (2018.01)

(52) U.S. Cl.
CPC ..... *G06Q 30/0623* (2013.01); *G06Q 30/0631* (2013.01); *H04W 4/027* (2013.01); *H04W 4/80* (2018.02)

(58) Field of Classification Search
CPC .................. G06Q 30/0641; G06Q 30/0623
See application file for complete search history.

(56) References Cited

U.S. PATENT DOCUMENTS

| | | | |
|---|---|---|---|
| 2007/0182555 A1* | 8/2007 | Walker | G07G 1/0036 340/572.1 |
| 2008/0021766 A1 | 1/2008 | McElwaine et al. | |
| 2008/0046345 A1 | 2/2008 | Serre | |
| 2011/0060652 A1 | 3/2011 | Morton | |
| 2011/0150425 A1* | 6/2011 | Candelore | H04N 21/4325 386/250 |
| 2014/0351098 A1* | 11/2014 | Shafer | G06Q 10/087 705/28 |

(Continued)

OTHER PUBLICATIONS

Showcasing new technology, Dec. 26, 2012, SyndiGate Media Inc. (Year: 2012).*

*Primary Examiner* — Brittney N Miller
(74) *Attorney, Agent, or Firm* — Harness, Dickey & Pierce, P.L.C.

(57) ABSTRACT

Systems and methods are provided for tracking products within a merchant location, based on movement of the product at the merchant location. An example method includes receiving, at a communication hub distributed in a merchant location, a plurality of movement indicators from a tag associated with a product where the movement indicators each indicate movement of the product and each including an identifier. The method also includes tracking, by the communication hub, the product in the merchant location based on the movement indicators.

13 Claims, 3 Drawing Sheets

(56) References Cited

U.S. PATENT DOCUMENTS

| | | | |
|---|---|---|---|
| 2015/0081474 A1* | 3/2015 | Kostka | H04W 88/08 705/26.8 |
| 2015/0112826 A1* | 4/2015 | Crutchfield, Jr. | G06Q 30/0643 705/26.1 |

* cited by examiner

SYSTEM AND METHODS FOR PRESENTING INFORMATION ABOUT PRODUCTS BASED ON MOVEMENT OF THE PRODUCTS

CROSS-REFERENCE TO RELATED APPLICATION

This application is a continuation of U.S. patent application Ser. No. 14/509,363 filed Oct. 8, 2014. The entire disclosure of the above application is incorporated herein by reference.

FIELD

The present disclosure generally relates to systems and methods for presenting information about products to consumers, in response to movement of the products, for example, by the consumers.

BACKGROUND

This section provides background information related to the present disclosure which is not necessarily prior art.

Merchants are known to offer products for sale at merchant locations. The products are often packaged with certain information about the products listed on the packaging. In addition, or alternatively, the products are stocked onto shelves, which may include paper placards indicating product names, product numbers and prices. Some of these paper placards include additional information about the products.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Merchants offer products for sale to consumers at merchant locations. Products offered for sale may include products packaged for sale or unpackaged for sale, and/or in certain circumstances, display samples, which permit consumers to interact with the products prior to purchase. At merchant locations, information about the products offered for sale may be limited. The systems and methods herein permit the merchant to sense movement of products and to present expanded information about the products, at a display, for example, in response to its movement. Specifically, a movement tag is associated with a product offered for sale, which senses movement of the product, and permits a communication hub to present a wide array of information about the product to the consumer. In this manner, the merchant may offer an interactive experience at the merchant location, where the products are present, thereby resulting in more informed decisions in purchasing, or not purchasing, the product.

Additionally, or alternatively, the systems and methods herein may permit data related to the movement of products in or around merchant locations, prior to purchase, at purchase, and after purchase, to be gathered and analyzed. Based on such data, the information presented to consumers about the products and/or other aspects of the consumers' purchase experiences may be evaluated, and potentially modified.

Figure 1:
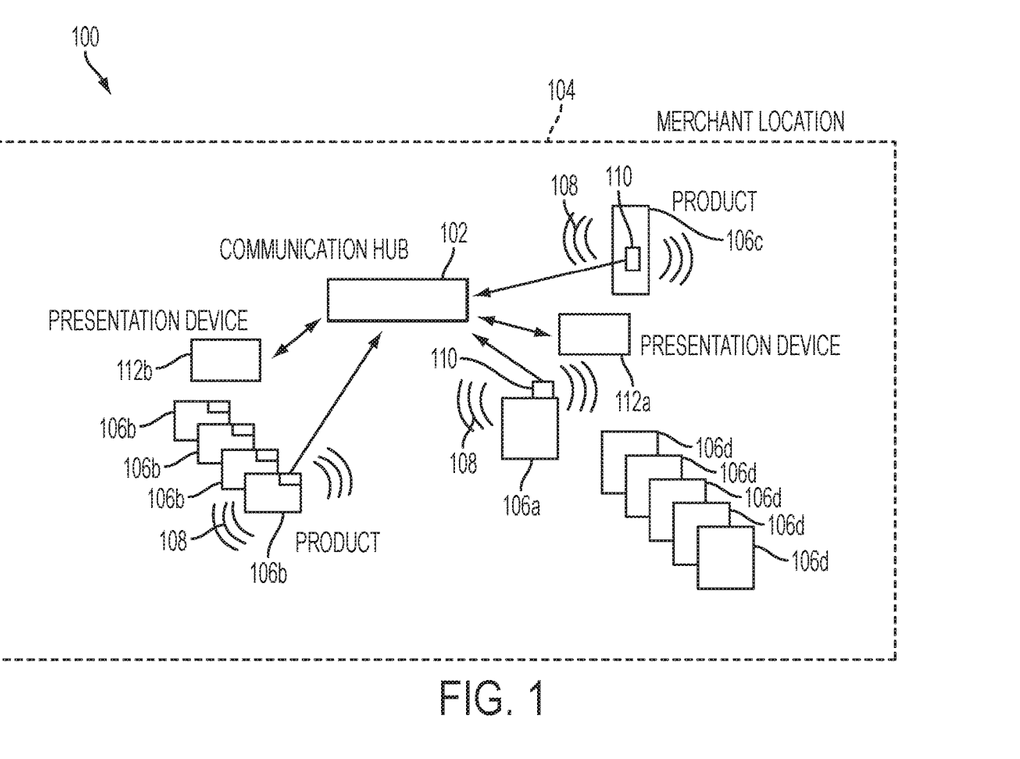
FIG. 1 is a block diagram of an exemplary system for use in presenting information about a product to a consumer in response to movement of the product, where the system includes a communication hub and a tag coupled to the product.

With reference now to the drawings, FIG. 1 illustrates an exemplary system 100, in which one or more aspects of the present disclosure may be implemented. Although the system 100 is presented in one arrangement, it should be appreciated that other exemplary embodiments may include the same or different components arranged otherwise, depending on, for example, the type of retail location, the number of products associated with tags of the system 100, a merchant's use of the system 100, etc.

The illustrated system 100 generally includes a communication hub 102 located at a merchant location 104. The communication hub 102 may be a single device, or multiple devices located together or distributed throughout the merchant location 104. For example, the communication hub 102 may be distributed at the merchant location 104 to permit tracking of the products at the merchant location 104, as described below. In at least one embodiment, the communication hub 102 may include multiple devices, in which at least one of the multiple devices is located remote from the merchant location 104.

Figure 2:
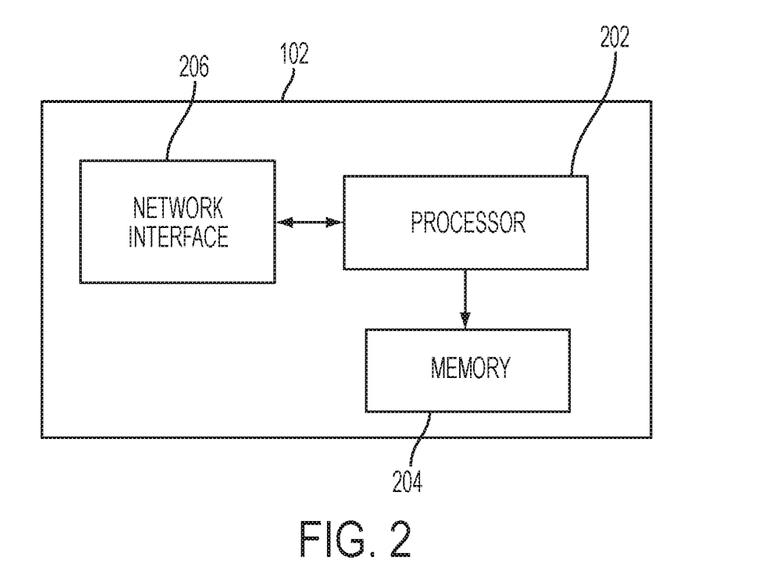
FIG. 2 is a block diagram of the exemplary communication hub of FIG. 1.

FIG. 2 is a detailed view of the communication hub 102 of the system 100.

As shown, the communication hub 102 includes a processor 202 and a memory 204 that is coupled to the processor 202. The processor 202 may include one or more processing units. The computing device 200 is programmable to perform one or more operations described herein by programming the processor 202 and/or the memory 204. The processor 202 may include, but is not limited to, a general purpose central processing unit (CPU), a microcontroller, a reduced instruction set computer (RISC) processor, an application specific integrated circuit (ASIC), a programmable logic circuit (PLC), a gate array, and/or any other circuit or processor capable of the functions described herein. The above examples are exemplary only, and thus are not intended to limit in any way the definition and/or meaning of processor.

The memory 204, as described herein, is one or more devices that enable information, such as executable instructions and/or other data, to be stored and retrieved. The memory 204 may include one or more computer-readable media, such as, without limitation, dynamic random access memory (DRAM), static random access memory (SRAM), read only memory (ROM), solid state devices, and/or hard disks. The memory 204 may be configured to store, without limitation, product specifications, product pricing, product instructions, product reviews, product ratings, listings of comparable and/or related products, listings of product accessories, and/or other information described herein, etc.

The memory 204 further includes a tag data structure. In the illustrated embodiment, the tag data structure is a database of tags, tag identifiers, presentation devices, product information, and/or associations therebetween, etc. The tag data structure, in various embodiments, is generated when a product is received and/or stocked at the merchant location 104. For example, an identifier associated with a tag on the product may be received from the tag, or read from the packaging of the product, and then stored in memory 204 as associated with a particular product and/or presentation devices, etc. Alternatively, or additionally, in some examples, tags are programmed with specific identifiers at the merchant location 104, or prior to arrival at the merchant location 104, which are associated with a particular product, products, the merchant and/or presentation device(s) in the tag data structure, The communication hub 102 also includes a network interface 206 coupled to the processor 202 and the memory 204. The network interface 206 may include a wired network adapter and/or a wireless network, either being configured to conform to one or more standards, such as, for example, Bluetooth, near-field communication (NFC), IEEE 802 (e.g., 802.11, etc.), etc., or non-standard protocols. In the illustrated embodiment, the network interface 206 is configured to receive Bluetooth transmissions from one or more tags (described below) and further configured for IEEE 802 communication, wired or wireless, with one or more presentation devices, as described herein. The network interface 206 may include multiple modules integrated together, or separate. It should be appreciated that different standards and/or types of network interfaces may be employed in other communication hub embodiments, depending on, for example, the type of tags, presentation devices, and any other devices included in the systems. Further, while separate in the illustrated embodiment of FIG. 2, the network interface 206 and the processor 202 may be integrated in other embodiments.

Referring again to FIG. 1, the system 100 further includes multiple products offered for sale 106a-d. The products 106a-d may be products packaged or unpackaged for purchase by a consumer, or sample products with which the consumer is permitted to interact. It should be appreciated that the tags 110 may be coupled to the products in any manner, which permits the movement of the tag 110 to be generally indicative of movement of the product. The tags 110 may be coupled to the product, such that the tags 110 may or may not be accessible to a merchant. In one example, the tag 110 may be accessible to the merchant outside the product or packaging, to enable a battery (not shown) of the tag 110 to be connected, for example, by removing a non-conductor disposed between the battery and battery contacts (not shown) after the product arrives at the merchant location 104. In other examples, the battery of the tag 110 is connected prior to receipt at the merchant location 104. Further, in one or more embodiments, when the tags 110 are embedded within the product or packaging of the products, one or more indicators of the tag 110 (e.g., an identifier, etc.) may be scanned/read and provided on the outside of the product or packaging (so that the identifier may be added to a tag data structure, for example).

As shown in FIG. 1, the products 106a-c are associated with movement tags 110. The tag 110 is coupled to the outside of the product 106a (or packaging of the products), via adhesive or some other known mechanism/method. The tags 110 are embedded within the products 106b and within the packaging of the product 106c. In one example, a tablet computer product may be packaged within a box and shrink wrapped, with a movement tag 110 embedded within the box, or in between the box and the shrink wrap. As indicated above, the association of the tag 110 with the product may be different in other embodiments.

Further, in the illustrated embodiment, tags 110 are omitted from products 106d at the merchant location 104, which are the same product as the product sample 106a. In this manner, the consumer may interact with the product sample 106a, but then purchase the packaged product 106d. For certain products, it may be inefficient to associate a tag for each product, such that tagging a sample product may be preferred for triggering presentation of information about the product. For example, where the product is more interactive as a sample than in its original packaging (e.g., a camera, etc.), a merchant may opt to drive the presentation of information with the product sample 106a, rather than the packaged products 106d. It should be appreciated that various reasons may exist to include or omit tags, including, for example, the type, size, packaging, cost and features of products.

Figure 3:
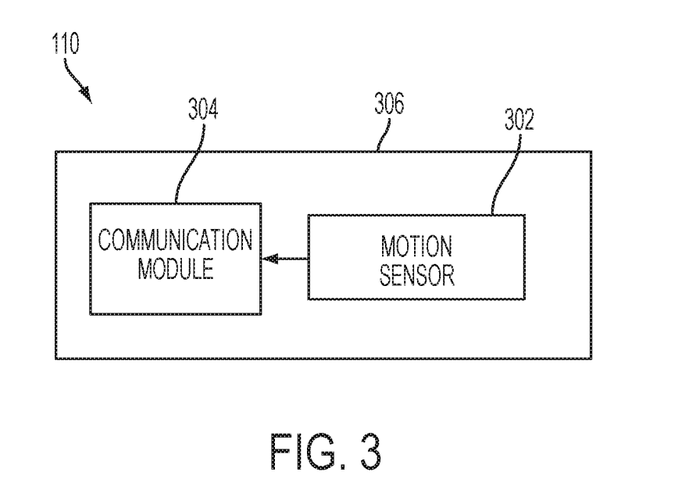
FIG. 3 is a block diagram of the exemplary tag of FIG. 1.

FIG. 3 illustrates a detailed view of the movement tag 110 of the system 100. As shown, the tag 110 includes a motion sensor 302 and a communication module 304. The motion sensor 302 is configured to sense movement of the tag 110 and to generate an output indicative of movement. The motion sensor 302 is an accelerometer in this exemplary embodiment, but may include any other device suitable to generate an output upon its movement or rotation, or to permit the communication hub 102, for example, to detect its movement in other embodiments. The communication module 304 is configured to receive the output from the motion sensor 302 and to transmit a movement indicator. In some embodiments, the communication module 304 may be configured to receive an output signals for a predefined interval, or of a predefined intensity, before transmitting a movement indicator. For example, the communication module 304 may require an output from the sensor 302 for some interval (e.g., about 300 milliseconds, etc.) before transmitting a movement indicator. The interval may be included, for example, to distinguish a purposeful movement of the product by the consumer, from merely jostling the product by movement of adjacent products. Additionally, or alternatively, the communication module 304 may employ a minimum duration between transmitted movement indicators, including, for example, about 10 seconds, 20 seconds, or another suitable interval. Such minimum durations may be employed, in some examples, to save on battery life.

It should be appreciated that other sensors, in addition to the motion sensor 302, may be included in other tag embodiments. Such sensors may include barometers, thermometers, acoustic sensors, compasses, or other known sensors, etc. In at least one embodiment, a motion sensor may be omitted from the tag depending on, for example, the type of tag (e.g., passive versus active). Specifically, for example, tags may transmit a movement indicator when entering an electric field generated by the communication hub, where the communication hub is acting as a reader of the passive RFID or magnetic/inductor tags. More generally, in several embodiments, the tag may be configured such that movement of the tag is detected, by a communication module, when the tag passes into or out of some area associated with the communication module.

In this exemplary embodiment, the communication module 304 incorporates a processor, as described above, and a wireless, radio-frequency (RF) module (not shown), such as, for example, a Bluetooth device, an RFID device, a NFC device, or another device suitable to communicate with the communication hub 102. The processor and the wireless module are integrated into a single integrated circuit, but may be separate in other embodiments. The range of the communication module 304 may be any desired range, for example, about 10 feet, about 30 feet, about 100 feet, about 150 feet, about 330 feet, or another range depending on, for example, the particular communication module 304 employed, and/or the arrangement of the communication hub 102 in or around the merchant location 104, etc.

The movement indicator transmitted by the communication module 304 of the tag 110 includes at least an identifier. The identifier may be specific or unique to the product with which the tag 110 is associated, or may be specific to only a general type or model of product, or may be unique to the tag 110, etc. For example, the identifier may denote that the product is the Brand X tablet, or may denote that the product is the model ABC of the Brand X tablet, or may denote that the product is the tablet with serial number #ABC123. Additionally, or alternatively, the identifier may be included in the tag 110 prior to association with the product, or after association with the product. In one example, the merchant programs the tags 110 with particular identifiers, while in another example, a product manufacturer programs the tags 110 prior to or after associating the tags 110 with products.

In various embodiments, in addition to, or as part of, the identifier, the movement indicator may include additional information, or additional detail about the product. For example, a manufacturing date and/or batch code may be included in the movement indicator, or other information specific to the manufacturer or product. In another example, the movement indictor may indicate movement of the tag 110 in each of the 3 axes of the motion sensor 302 (or product 106), or may otherwise indicate a character of the movement of the tag 110. The information included in the movement indicator may extend beyond movement of the tag 110, and may include other information depending on, for example, type and number of sensors included in the tag, etc. Further, the movement indicator, its format, and the information contained therein may be configured by the merchant, or prior to its arrival at the merchant location 104.

Although the sensor 302 and communication module 304 are illustrated as separate in FIG. 3, it should be appreciated that the sensor 302 and communication module 304 may be integrated together. For example, the sensor 302 and communication module 304 may be included in the integrated circuit board, such as, for example, the MetaWear™ board from MbienLabs, San Francisco, Calif., which includes, for example, an ARM Cortex processor.

In the illustrated embodiment, the movement tag 110 includes a housing 306, which encloses the sensor 302 and the communication module 304. In various embodiments, the tag 110 may be integrally formed or incorporated into the products 106 or their packaging. Additionally, or alternatively, the tag housing 306 may be configured to be coupled to the product, or its packaging. For example, a tag may be separate from the product, yet include an adhesive surface, a clip, an aperture formed in the housing to receive a mechanical connector or fastener, etc. to couple thereto.

The tag 110 is generally compact in size, to facilitate association with the product offered for sale. The manner in which the tag 110 is associated to the product 106, whether coupled to or incorporated in, will often depend on the product 106, and its packaging as previously described.

Referring again to FIG. 1, the illustrated system 100 also includes two presentation devices 112a-b disposed at the merchant location 104, and positioned proximate to products 106b and products 106a,c, respectively. It should be appreciated that the number and/or position of the presentation devices 112a-b may be different in other embodiments, depending on, for example, the number of products offered for sale, the distribution of products, the types of products, the relationship between products, etc. Generally, the presentation devices 112a-b may be configured to present information visually and/or audibly. As such, the presentation devices 112a-b are positioned proximate to the products 106a-c such that they are perceivable, (e.g., viewable or audible, etc.) from the location of the products 106a-c, for which information is to be presented in accordance with the description herein. For example, the presentation device 112a-b may be within a line-of sight from the product 106, such that the consumer, picking up the product from where it is displayed or stocked, is able to see the presentation device 112a-b. Each of the presentation devices 112a-b may include, without limitation, a cathode ray tube (CRT), a liquid crystal display (LCD), a light-emitting diode (LED) display, an organic LED (OLED) display, an "electronic ink" display, a speaker, and/or other device suitable to present information to a consumer, etc.

The system 100 is configured to present information to the consumer at one or more of the presentation devices 112a-b, based on sensed movement of the product 106a-c by tags 110. Specifically, for example, when a consumer is shopping in the merchant location 104 and picks up a product 106a (i.e., moves the produce 106a from one position to another position, etc.), the tag 110 associated with the product 106a senses movement of the product 106a. In turn, the tag 110, and specifically the communication module 304, transmits a movement indicator, as indicated by reference 108. The communication hub 102 receives the movement indicator (or more broadly, detects movement of the tag 110), and identifies the presentation device 112a associated with the tag 110, based on the movement indicator. The communication hub 102 then causes information related to the product 106a to be presented at the identified presentation device 112a.

The information, as previously described, may include various different types of information relating to the product, including, without limitation, product pricing, product specifications, product reviews, product instructions, product rating, comparable products (i.e., products which include one or more similar features, or may be generally interchangeable, etc.), etc. Additionally, or alternatively, the information may include a listing of one or more accessories suitable for use with the product. For example, if a smartphone is the product moved by the consumer, a listing of cases, headsets, extras batteries, and chargers suitable for use with the particular smartphone may be presented, e.g., displayed, at the presentation device. In another example, if a Brand X tablet is moved by the consumer, Brand A, Brand B, and Brand C tablets may also be presented, e.g., displayed, at the presentation device, with particular specifications for each brand of tablet also presented for comparison. In this manner, the consumer gains access to information about the product or products by merely moving the product, thereby permitting the merchant to educate the consumer about the product (or comparable/related products) and allow the consumer to make a more informed purchasing decision, if desired.

It should be appreciated that the amount, type, and sequence of information presented to the consumer may vary depending on the product, the proximity of different products, the merchant, the merchant locations, etc.

Figure 4:
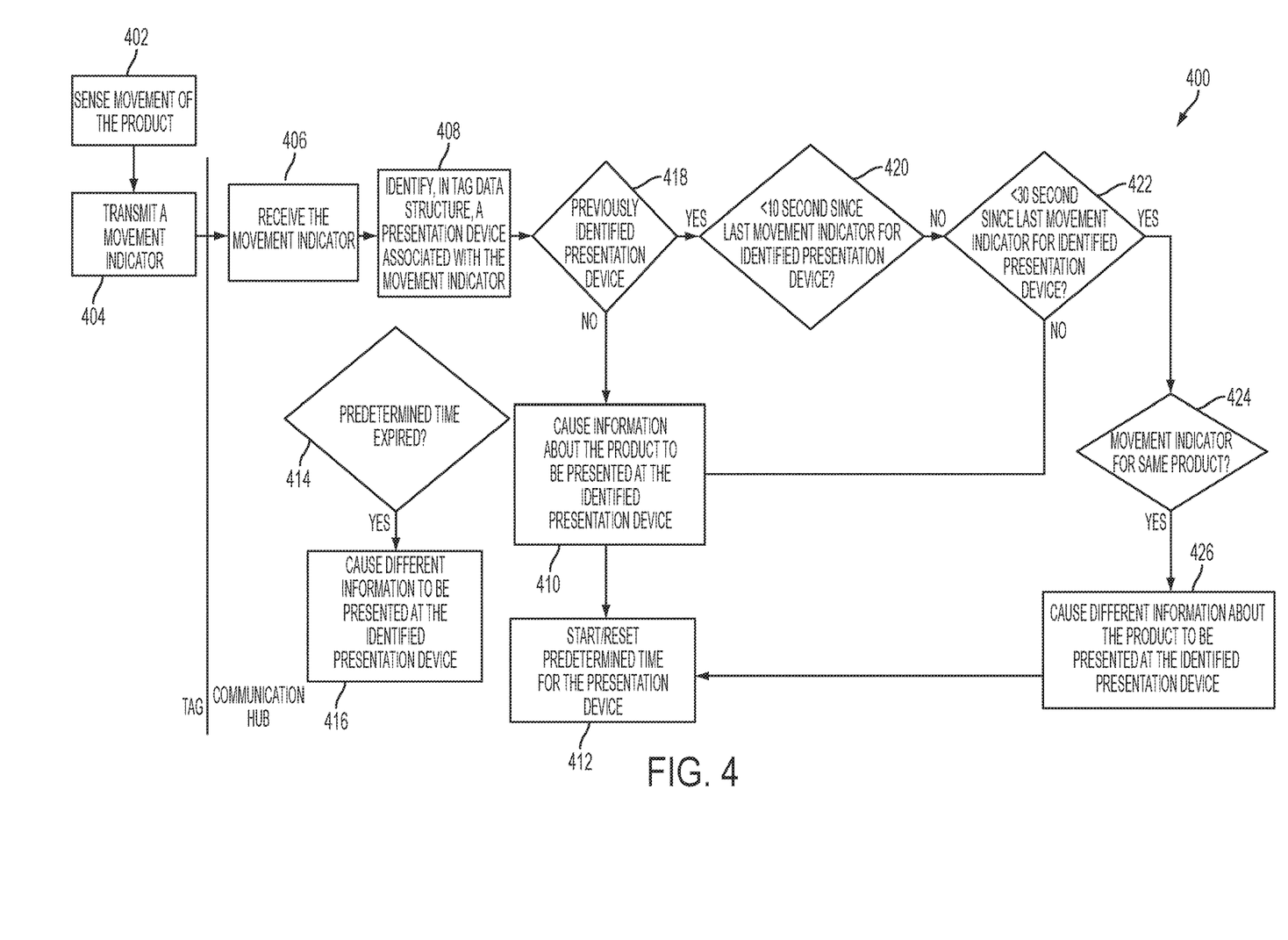
FIG. 4 is an exemplary method, suitable for use with the system of FIG. 1, to present information about a product to a consumer.

FIG. 4 illustrates an exemplary method of presenting information about a product. The method 400 is described with reference to system 100 and in particular, product 106a. It should be understood, however, that the method 400 is not limited to the exemplary system 100. Likewise, the system 100 should not be understood to be limited to the exemplary method 400.

When a consumer picks up the product 106a, the tag 110 senses the movement of the product, at 402, and transmits a movement indicator, at 404. The movement indicator includes at least an identifier. The communication hub 102 receives the movement indicator from the tag 110, at 406. The communication hub 102 identifies in the tag data structure, at 408, the presentation device 112a associated with the movement indicator, and in particular, the identifier included in the movement indicator. Then, the communication hub 102 causes, at 410, information about the product 106a to be presented (e.g., displayed, etc.) at the identified presentation device 112a.

Specifically, in this embodiment, the consumer is presented with information about the product, in response to the consumer's movement of the product. In various implementations, the amount and type of information presented at the identified presentation device 112a is enhanced information previously available at the merchant location 104 per product, because, for example, a single presentation device may be employed to sequence through different information about the product or multiple products. In this manner, a substantial volume of dynamic information may be offered to the consumer, at the merchant location 104, within a particular space, for example, a space needed for a presentation device 112 (e.g., a 12-100 inch LCD or LED display disposed above a kiosk of products, etc.).

In addition to the presentation of initial information, the communication hub 102 may cause subsequent information to be presented at the identified presentation device 112a, based on a number of different conditions.

As shown in FIG. 4, the method 400 further includes a predetermined time, which is started, at 412, after the communication hub 102 causes information to be presented at the presentation device 112a. The predetermined time is a time period for which the information about the product 106a is to be presented to the consumer (for example, in the absence of another movement indicator identifying the presentation device 112a). The predetermined time may include any suitable time, including, without limitation, about 60 seconds, about 90 seconds, 3 minutes, about 5 minutes, etc. At 414, the communication hub 102 determines if the predetermined time has expired. If expired, the communication hub 102 causes, at 416, different information to be presented at the presentation device 112a. Such information may include different information about the product 106a, or a different product or products, an advertisement related or unrelated to the product 106a, information about the merchant, etc. In particular, for example, after a consumer picks up the product 106a, replaces it, and walks away, it may be beneficial to alter the information at the presentation device 112a to present discounted products, or information about the merchant, or other advertisements, rather than continue to present information for the product 106a when the consumer has moved on to other products.

In addition to the predetermined time, the method 400 further includes conditional steps for movement indicators received from the tag 110, or other tags 110, which are associated with the same presentation device 112a. Here, the communication hub 102, after identifying the presentation device 112a, determines if the presentation device 112 has been identified previously, at 418. If no, at 418, the method proceeds to step 410.

If yes, at 418, the communication hub 102 determines, at 420, if it has been more than 10 seconds, for example, since it received a prior movement indicator for the presentation device 112a. If no, at 420, the communication hub 102 takes no further action on the received movement indictor. In this way, the communication hub 102 may permit the consumer to perceive the information presented at the presentation device 112a for a limited time interval, without the consumer's further movement of the product 106a causing the presented information to change. If yes, at 420, the communication hub 102 then determines at 422 if it has been less than 30 seconds, for example, since receiving the last movement indicator. If no, at 422, the method proceeds to step 410, and the communication hub 102 causes information about the product 106a indicated by the movement indictor to be presented at the presentation device 112a. In this manner, the communication hub 102 reserves the original information on the presentation device 112a for a period of time, then permits different information about other products to be presented. This may, in some examples, reduce the potential for interference between different consumers attempting to view information about the same or different products at the presentation device 112a. After causing the information to be presented, at 410, the communication hub 102 resets the predetermined time, at 412.

If yes, at 422, the communication hub 102 determines, at 424, if the movement indicator relates to the same product 106a (or potentially, from the same tag 110). If no, at 424, the communication hub 102 takes no further action on the received movement indictor. In this way, the method 400 permits one consumer to view information about a product for at least 30 seconds, without a second consumer causing information about a different product to be presented at the presentation device 112a. Conversely, if yes, at 424, the communication hub 102 causes at 426 different information about the product 106a to be presented at the presentation device 112a. In this manner, the second movement of the product 106a, and further movements of the product 106a, permits the consumer in some examples to scroll through different information about the product 106a at the presentation device 112a. After causing the different information to be presented, the communication hub 102 resets the predetermined time, at 412.

It should be appreciated that the type, volume, content, and sequence of information for the same or different products at a presentation device may be different in other embodiments. For example, each product may be associated with an information schedule, which is specific or generic thereto. The schedule indicates to the communication hub 102, which information to be presented, and in what sequence (e.g. first information, second information, etc.), the type, volume, content and sequence may vary greatly depending of the product. It should further be appreciated that the time intervals and predetermined times described above are merely exemplary, and that other time internals and predetermined times may be used on other embodiments.

In various embodiments, the communication hub 102 may further determine, based on inputs from a merchant, for example, the manner in which information is presented at the presentation devices 112a-b. In one embodiment, when the method 400 causes the communication hub 102 to present information about a different product, the subsequent information may be presented in place of the prior information at the presentation device 112. Alternatively, in some embodiments, the information may be displayed, in a split-screen or other arrangement at the presentation device 112a. For example, when a consumer picks up a first digital camera and then picks up a second different camera, information about the first and second cameras may be presented side-by side at the presentation device 112a. In this way, the consumer may be able to compare, side-by-side, related information about two different products.

In various embodiments, a sales person at the merchant location 104, and not the consumer in some examples, may move the product 106a one or more times to cause information about the product to be displayed to the consumer. For example, the sales person may move the product 106a, wait 20 seconds and then move the product 106a again (or move the product 106a in a particular direction) to advance the information displayed at the presentation device 112a to address a question posed by the consumer, the sales person, in this example, may be more familiar with when/how to move the product to get to the most relevant information for the consumer's question. Whether by the consumer, or by a sales person, it should be appreciated that presenting information, or different information about a product in response to movement of the product may, in some embodiments, provide expanded, or even unlimited, information about the product to the consumer. In this way, the consumer is able to make more informed decisions about purchasing, or not purchasing, the product.

In at least one other embodiment, the presentation device 112a includes one or more input device to receive inputs to alter the information presented at the presentation device 112a. For example, the presentation device 112a may include a touchscreen suitable to permit the consumer to select particular information about the product. The input device(s) may be used instead of, or in addition to further movement of the product.

In addition to causing information to be presented to the consumer, the communication hub 102 may further append data to the tag data structure or another data structure associated with the receipt of movement indicators. Specifically, for example, the communication hub 102 may identify and store data based on the movement indicators in memory 204, including, for example, temporal indicators (e.g., date and time) of one or more movement indicators, a duration between movement indicators from the same tag 110, movement information related to one or more axes of the product, one or more directions of the movement, duration of the movement, etc. The communication hub 102, when employed in multiple devices, may further store the particular communication hub (or location) at which the movement indicator is received. In this manner, the communication hub 102 generates a profile of a product as it is stocked, moved by one or more consumers, and up to and including purchase. In some embodiments, in which the identifier included in the movement indictor is product specific, the above information and other information (e.g., the duration of movement of a particular product) may be stored on a per product basis. In other embodiments, the above data may be identified and stored at whatever granularity is permitted by the identifier, the movement indicator, the distribution of the communication hub 102, and/or as desired by the merchant or other entity associated with the merchant location 104.

Additionally, the communication hub 102 may be further configured to identify and store a signal strength of one or more movement indicators. The signal strength is indicative of the approximate distance between the communication hub 102, and the tag 110 from which the movement indicator is transmitted. The approximate distance may be used, by the communication hub 102, to determine the location of the product, for example. In various embodiments, the communication hub 102 may be located specifically throughout the merchant location 104, so that the system 100 may detect certain stages of the purchase process. In one example, in which the communication hub 102 is located in close proximity to point of sale (POS) terminals, the signal strength of the movement indictor may be used to determine if the product is being purchased (i.e., the signal strength is sufficiently high, indicating the product is within a predefined distance of the POS terminals). In another example, the communication hub 102 may be located throughout the merchant location 104, including at an entrance/exit. When a movement indicator is only received at the communication hub 102 at the entrance/exit, the communication hub 102 may determine the product 106 has been removed from the store, after purchase or theft.

Further, the communication hub 102, in some embodiments, may further track a location of the product as it is moved throughout the merchant location 104. Specifically, for example, the communication hub 102 may be dispersed at multiple locations throughout the merchant location 104, such that a movement indicator from the product 106a would be received by the communication hub 102 at least at three different locations in the merchant location 104. Based on the received movement indictors, and the relative strength of the movement indicators at the three locations (e.g., at three different devices of the communication hub 102), a location of the product 106a may be triangulated by the communication hub 102. In this manner, the communication hub 102 may track, consistently or intermittently, the movement of products with tags 110 throughout the merchant location 104.

It should be appreciated that the movement indicators, the placement of the communication hub 102 and/or approximate distances to the tags 110 may be used to determine a variety of different information about the purchase behaviors of consumers, in general or relative to specific products.

It should be understood that the information gathered from the tags 110 may be used, by the communication hub 102, or other systems or persons, in a variety of different ways. For example, longer durations for which a consumer inspects a product at the merchant location 104, and moves it to view different sides of the packaging may indicate, in some instances, the information on the packaging is too complex or the information displayed at the presentation device 112a-b is insufficient.

Further, in another example, minimal movement of a product prior to purchase may indicate the product is often purchased with little or no inspection which may cause the communication hub 102 to reduce the information presented at the presentation device 112a-b is for that product. In yet another example, consistent movement of two like products in the same relative time period may indicate the products are closely comparable, which may cause the communication hub 102 to update comparable product information.

In another example, if the communication hub 102 is repeatedly causing different information about the same or different product to be displayed at the presentation device 112a-b, the communication hub 102 may cause new information to be displayed side-by-side with prior information in some instances (e.g., at particular times of day, etc.), rather than in place of the prior information, to increase the information presented at the presentation device 112a-b. In such examples, the communication hub 102 may further, or alternatively, adjust the predetermined times and intervals used in responding to consecutive movement indictors. In the above example, the data identified and stored by the communication hub 102 is fed back into the system 100, in some embodiments, to enhance performance. In the same or other embodiments, the data may be used outside of the system 100 to affect marketing, sales, and/or manufacturing efforts associated with one or more products.

In at least one embodiment, the tags 110 are employed to gather data, and are incorporated in a system, which omits the presentation of information at presentation devices at the merchant location 104.

It should be appreciated that the functions and steps described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

In one exemplary embodiment, a system for gathering data related to a product offered for sale at a merchant location includes a product and a movement tag coupled to the product. The tag includes a motion sensor configured to generate an output when moved; and a communication module coupled to the motion sensor, the communication module configured to receive the output from the motion sensor and broadcast a movement indicator. The movement indicator includes an identifier, which is unique to at least one of the movement tag and the product.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following steps: (a) receiving a first movement indicator from a first tag associated with a first product, the first movement indicator indicating movement of the first product, the first movement indicator including a first identifier; (b) identifying, in a tag data structure, a presentation device associated with the first identifier; (c) causing information about the first product to be displayed at a presentation device located proximate to the first tag; (d) identifying and storing data based on the movement indicator to a tag data structure stored in a memory, including, for example, a temporal indicator and a signal strength of the movement indicator; (e) receiving a second movement indicator from the first tag associated with the first product; (f) causing different information about the first product to be displayed, at said presentation device; (g) comprising receiving a second movement indicator from the first tag; and (h) causing the second information about the first product to be displayed after receiving the second movement indicator.

With that said, exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Specific values disclosed herein are example in nature and do not limit the scope of the present disclosure. The disclosure herein of particular values is not exclusive of other values that may be useful in one or more of the examples disclosed herein.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," "coupled to," "associated with," or "included with" another element or layer, it may be directly on, engaged, connected or coupled to, or associated with, or included with the other element or layer, or intervening elements or layers may be present. As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally," "about," and "substantially," may be used herein to mean within manufacturing tolerances.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the exemplary embodiments.

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for tracking products within a merchant location, the system comprising:
   a communication hub including a tag data structure, the communication hub disposed at the merchant location;
   a tag associated with a product at the merchant location, the tag configured to provide one or more movement indicators to the communication hub, each of the one or more movement indicators including an identifier associated with the product; and
   a presentation device coupled to the communication hub, the presentation device disposed at the merchant location;
   wherein the communication hub is configured to:
      receive a first nonevent indicator from the tag in response to a motion sensor of the tag detecting a first movement of the product from a first position to a second position;
      in response to receiving the first movement indicator, cause information related to the product to be presented at the presentation device;
      receive a second movement indicator from the tag in response to the motion sensor of the tag detecting a second movement of the product from the second position to a third position; and
      in response to receiving the second movement indicator, cause the presentation device to scroll from the information presented at the presentation device to different information related to the product.

2. The system of claim 1, wherein, in order to provide the first and second movement indicators, the motion sensor of the tag is configured to sense movement of the product and the tag is configured to transmit the first and second movement indicators to the communication hub in response to said movement.

3. The system of claim 2, wherein the tag includes a communication nodule configured to communicate wirelessly with the communication hub and wherein the motion sensor is an accelerometer coupled to the communication module;
   wherein the accelerometer is configured to sense the movement of the product and to generate an output indicative of the movement; and
   wherein the communication module is configured to transmit the first and second movement indicators in response to the output from the accelerometer, whereby the first and second movement indicators are indicative of the movement of the product from the first position to the second position and from the second position to the third position, respectively.

4. The system of claim 3, wherein the communication module includes one of a radio-frequency (RF) device, a RFID device, a Bluetooth device, and a NFC device.

5. The system of claim 1, wherein the communication hub is configured to identify and store a signal strength associated with each of the one or more movement indicators.

6. The system of claim 5, wherein the communication hub includes multiple devices distributed throughout the merchant location; and
   wherein the communication hub is further configured to determine that the product is being purchased based on one or more of the signal strengths relative to one of the multiple devices located at a point-of-sale terminal within the merchant location.

7. The system of claim 6, wherein one of the multiple devices is located at an entrance/exit of the merchant location; and wherein the communication hub is configured to determine that the product has been removed from the merchant location based on the one or more movement indicators, relative to the one of the multiple devices located at the entrance/exit of the merchant location.

8. A method of tracking products within a merchant location, the method comprising:
   receiving, at a communication hub disposed in the merchant location, a first movement indicator from a tag associated with a product in response to a motion sensor of the tag detecting movement of the product from a first position to a second position, the first movement indicator including an identifier associated with the product;
   in response to receiving the first movement indicator and based on the identifier, causing, by the communication hub, information related to the product to be presented at a presentation device disposed in the merchant location;
   receiving, at the communication hub, a second movement indicator from the tag in response to the motion sensor of the tag detecting movement of the product from the second position to a third position, the second movement indicator including the identifier; and
   in response to receiving the second movement indicator and based on the identifier, causing, by the communication hub, the presentation device to scroll from the information presented at the presentation device to different information related to the product.

9. The method of claim 8, wherein the communication hub includes multiple devices distributed throughout the merchant location; and
   further comprising determining, by the communication hub, a location of the product based on signal strengths for one of the of movement indicators at more than one of the multiple devices.

10. The method of claim 8, wherein the communication hub includes multiple devices distributed throughout the merchant location; and
    further comprising determining the product as being removed from the merchant location when one of the movement indicators is received only at a one of the multiple devices disposed at an entrance/exit of the merchant location.

11. A method of tracking products within a merchant location, the method comprising:
    receiving, by a communication hub having multiple devices distributed throughout the merchant location, a first movement indicator from a tag associated with a product at the merchant location in response to a motion sensor of the tag detecting movement of the product from a first position to a second position;
    in response to receiving the first movement indicator, causing, by the communication hub, information related to the product to be presented at a presentation device disposed in the merchant location;

receiving, by the communication hub, a second movement indicator from the tag associated with the product in response to the motion sensor of the tag detecting movement of the product from the second position to a third position;

in response to receiving the second movement indicator, causing, by the communication hub, the presentation device to scroll from the information presented at the presentation device to different information related to the product; and identifying and storing data based on the first and second movement indicators to a data structure stored in a memory, the data including at least a temporal indicator of each movement indicator and one or more signal strengths of each movement indicator, each of the one or more signal strengths associated with one of the multiple devices.

12. The method of claim 11, wherein the multiple devices include a first device located at an entrance/exit of the merchant location; and further comprising determining the product has been removed from the merchant location when one of the movement indicators is only received from the first device located at the entrance/exit of the merchant location.

13. The method of claim 11, further comprising:

identifying and storing, in the data structure, a duration between detection of the first movement indicator and detection of the second movement indicator; and tracking, by the communication hub, a location of the product based, at least in part, on the duration between detection of the first movement indicator and the detection of the second movement indicator.

* * * * *